US010732979B2

(12) United States Patent
Evers et al.

(10) Patent No.: US 10,732,979 B2
(45) Date of Patent: Aug. 4, 2020

(54) SELECTIVELY PERFORMING AHEAD BRANCH PREDICTION BASED ON TYPES OF BRANCH INSTRUCTIONS

(71) Applicant: ADVANCED MICRO DEVICES, INC., Santa Clara, CA (US)

(72) Inventors: Marius Evers, Santa Clara, CA (US); Aparna Thyagarajan, Santa Clara, CA (US); Ashok T. Venkatachar, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 229 days.

(21) Appl. No.: 16/011,010

(22) Filed: Jun. 18, 2018

(65) Prior Publication Data
US 2019/0384612 A1 Dec. 19, 2019

(51) Int. Cl.
*G06F 7/38* (2006.01)
*G06F 9/00* (2006.01)
*G06F 9/44* (2018.01)
*G06F 9/38* (2018.01)
*G06F 9/355* (2018.01)
*G06F 9/35* (2018.01)

(52) U.S. Cl.
CPC ............ *G06F 9/3844* (2013.01); *G06F 9/35* (2013.01); *G06F 9/355* (2013.01)

(58) Field of Classification Search
CPC .......... G06F 9/3844; G06F 9/35; G06F 9/355
USPC ....................................................... 712/239
See application file for complete search history.

(56) References Cited

U.S. PATENT DOCUMENTS

| 5,574,928 A * | 11/1996 | White | G06F 9/30014 708/495 |
| 5,903,772 A * | 5/1999 | White | G06F 9/30014 712/33 |
| 6,385,719 B1 * | 5/2002 | Derrick | G06F 9/3804 711/125 |
| 6,598,152 B1 * | 7/2003 | Sinharoy | G06F 9/3848 712/215 |

(Continued)

OTHER PUBLICATIONS

International Search Report and Written Opinion dated Sep. 30, 2019 for International Application No. PCT/US2019/036967, 9 pages.

(Continued)

*Primary Examiner* — Chun Kuan Lee

(57) ABSTRACT

A set of entries in a branch prediction structure for a set of second blocks are accessed based on a first address of a first block. The set of second blocks correspond to outcomes of one or more first branch instructions in the first block. Speculative prediction of outcomes of second branch instructions in the second blocks is initiated based on the entries in the branch prediction structure. State associated with the speculative prediction is selectively flushed based on types of the branch instructions. In some cases, the branch predictor can be accessed using an address of a previous block or a current block. State associated with the speculative prediction is selectively flushed from the ahead branch prediction, and prediction of outcomes of branch instructions in one of the second blocks is selectively initiated using non-ahead accessing, based on the types of the one or more branch instructions.

26 Claims, 9 Drawing Sheets

(56) References Cited

U.S. PATENT DOCUMENTS

| | | | |
|---|---|---|---|
| 6,910,124 B1* | 6/2005 | Sinharoy | G06F 9/3806 |
| | | | 712/228 |
| 2006/0149944 A1 | 7/2006 | Eisen et al. | |
| 2014/0019734 A1 | 1/2014 | Chaussade et al. | |
| 2016/0306633 A1* | 10/2016 | Mizrahi | G06F 9/3861 |
| 2017/0068538 A1 | 3/2017 | Bonanno et al. | |
| 2017/0115988 A1 | 4/2017 | Jung | |
| 2017/0199740 A1 | 7/2017 | Gschwind et al. | |

OTHER PUBLICATIONS

Seznec, A. et al., "Effective ahead pipelining of instruction block address generation," 30th ACM-IEEE International Symposium on Computer Architecture, Jun. 9-11, 2003; 12 pages.

Seznec, A. et al., "Multiple-Block Ahead Branch Predictors," Institut National de Recherche en Informatique et en Automatique; No. 2825, Mar. 1996; ISSN: 0249-6399; 30 pages.

* cited by examiner

US 10,732,979 B2

SELECTIVELY PERFORMING AHEAD BRANCH PREDICTION BASED ON TYPES OF BRANCH INSTRUCTIONS

BACKGROUND

Processing units perform different types of branch instructions to redirect (or "branch") a program flow to an instruction at an address indicated by the branch instruction. Types of branch instructions include unconditional branches that redirect the program flow to a predetermined target address, conditional branches that are "taken" to redirect the program flow to a target address if the condition is satisfied and "not taken" to continue sequential execution of instructions if the condition is not satisfied, call instructions that redirect the program flow to an address of a subroutine, return instructions that redirect the program flow from the subroutine to an address after the call instruction that initiated the subroutine, and indirect branch instructions that redirect the program flow to different addresses depending on the state of the processing unit.

Branch prediction techniques are used to guess the outcome of a branch instruction so that the processing unit can begin speculatively executing subsequent instructions along the predicted branch before the processing unit has evaluated the branch instruction. The processing unit predicts the outcome using information in an entry of a branch prediction structure associated with a block of instructions that includes the branch instruction. If the predicted branch turns out to be incorrect when the branch instruction is evaluated, speculative execution along the incorrectly predicted branch is suspended and the state of the processing unit is rolled back to the state at the branch instruction to begin executing along the correct branch. More specifically, both the branch prediction unit and the fetch unit are rolled back to process from the correct target of the branch, or the address after the branch if the branch was not taken.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
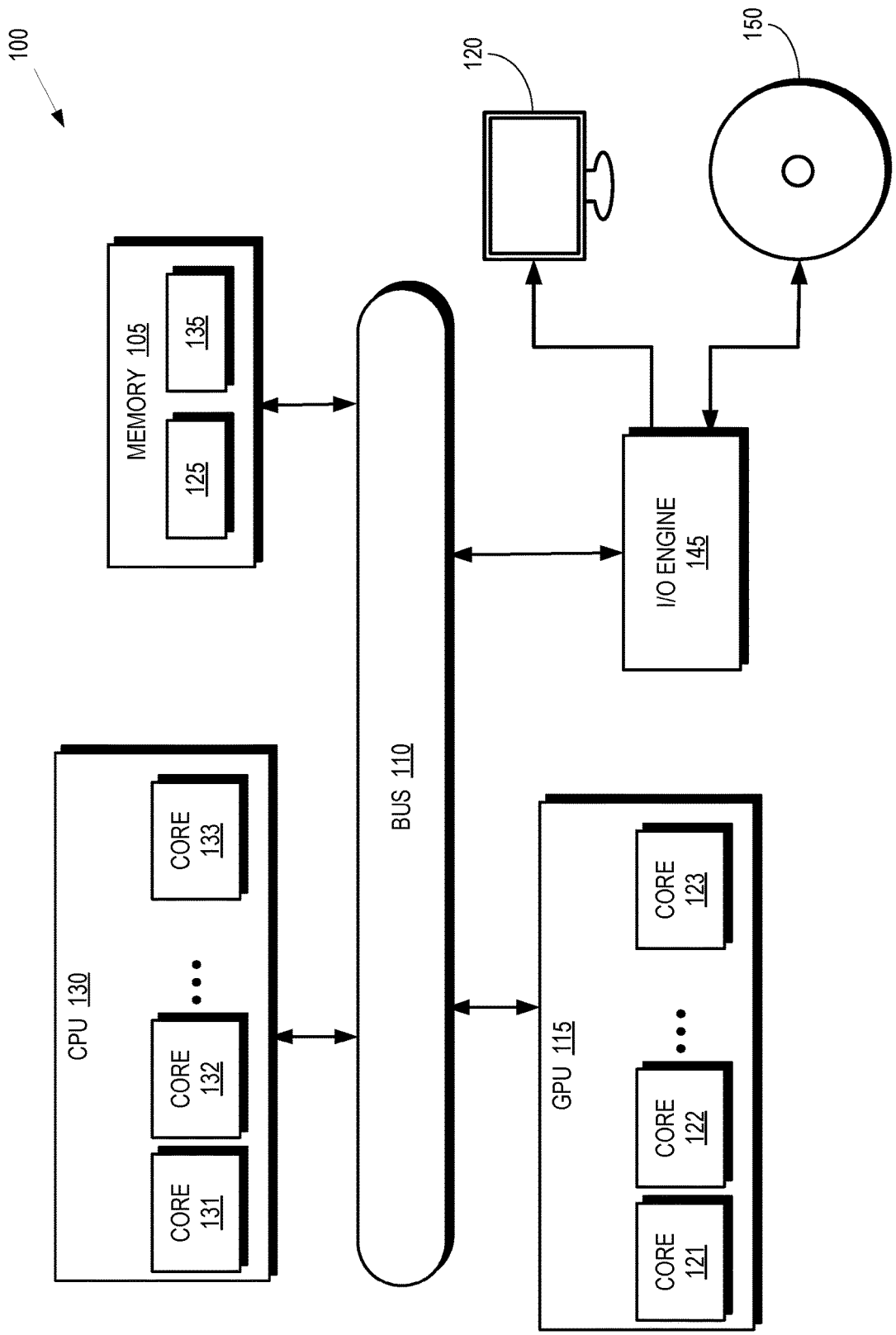
FIG. 1 is a block diagram of a processing system according to some embodiments.

In "predict ahead" techniques for branch prediction, an address of a first block is used as an index for accessing information in a branch prediction structure and a branch predictor storage. The information includes a set of entries corresponding to a set of potential subsequent blocks that are either targets of branch instructions in the first block or the block that follows the first block if all branches in the first block are predicted not taken. One subset of entries is selected from the set in response to the branch predictor predicting an outcome of the branch instructions in the first block. The predicted outcome indicates a second block including branch instructions corresponding to the subset of entries that includes branch prediction information for the branch instructions in the second block. The branch predictor uses the information in the subset of the entries to predict outcomes of the branch instructions in the second block prior to a determination of whether the outcome of the first block was correctly predicted. The address of the second block is used as an index to information that is used to predict outcomes of branch instructions in a third block at an address predicted as an outcome of one of the branch instructions in the second block. If the branch outcomes or targets of the first block were mispredicted, the processing unit is rolled back to the state at the end of the mispredicted branch instruction in the first block and begins execution along the correct path. If the incorrect prediction was that the branch instruction was "not taken" and the actual branch outcome was "taken," the correct path begins at another one of the set of potential subsequent blocks that are targets of the branch instructions in the first block. If the incorrect prediction was that the branch instruction was "taken" and the actual branch outcome was "not taken," the remaining portion of the first block is predicted and fetched before moving on to the second block. Thus, if the initial branch prediction is incorrect, the processing unit is required to restart the branch predictor based on the correct path, which increases the latency of the branch predictor.

The effectiveness of predict ahead techniques depends on the type of branch instruction. Predict ahead techniques typically reduce overall latency without sacrificing accuracy for conditional and unconditional branch instructions. However, using predict ahead techniques for other types of branch instructions can potentially sacrifice accuracy, relative to conventional branch prediction that uses the address of a block as an index to the information that is used to predict outcomes of branch instructions within the block. For example, a subroutine is typically accessed from multiple locations within a program. Multiple entries in the branch prediction structure are generated for a block within a subroutine if predict ahead is being used because each entry is indexed by a different source address within the program. Storing multiple entries for the same block consumes space in the branch target buffer, which leads to capacity misses. When the branch predictor fails to identify a branch due to such a branch target buffer miss, it results in a misprediction if the unidentified branch is taken. For another example, a return instruction from a subroutine returns to multiple target addresses in the program. The branch target buffer therefore includes entries for the blocks that begin at the multiple target addresses. If predict ahead is being used, the entries are indexed by the same source address (i.e., the address of the block containing the return instruction). A set-associative branch target buffer therefore stores the entries in the same set, which creates hotspots in the branch target buffer and causes conflict misses if the number of ways is less than the number entries indexed by the same source address. For yet another example, indirect branch instructions generate conflict misses because an indirect branch can jump to different target addresses depending on the state of the processing unit, which leads to multiple entries being indexed by the same source address in a manner that is similar to what happens for return instructions.

FIGS. 1-9 disclose branch prediction techniques that achieve most of the latency benefits of an ahead predictor while maintaining the accuracy of a conventional non-ahead predictor by selectively performing predict ahead branch prediction based on a type of a branch instruction in a first block. A branch predictor uses an address of the first block as an index for accessing information in a branch prediction structure. The information includes a set of entries corresponding to a set of second blocks that are potentially the targets of branch instructions in the first block or the block that follows the first block if all branches in the first block are predicted not taken. Multiple instances of the combinational logic for the branch prediction structure use branch prediction information from the set of entries corresponding to the set of second blocks to predict outcomes of the branch instructions in the (predicted and alternate) second blocks prior to a determination of the outcome of the branch instructions in the first block. The branch predictor determines the type of the branch instruction in the first block concurrently with the combinational logic predicting outcomes of the branch instructions in the second blocks. In response to the branch predictor determining that the type is in a predetermined subset of a set of types of the branch instructions, the branch predictor flushes state associated with speculative predictions of outcomes of the branch instructions in the second blocks and accesses an entry in the branch prediction structure for the second block using the address of the second block. For example, the branch predictor flushes state associated with speculative predictions of the second block if the first block was predicted to end in a call instruction, return instruction, or indirect branch instruction. The branch predictor then re-initiates prediction of outcomes of the branch instruction in the second block based on the entry that is indexed by the address of the second block.

The performance of some embodiments of branch predictors that implement predict ahead techniques is improved using a reduced number of index bits. For example, a predetermined number of least significant bits are dropped from the addresses that are used to generate indices of entries in the branch target buffer. Some software constructs include multiple branch instructions that are proximate to each other in address space and have the same target address. In predict ahead branch prediction, each of these branch instructions would generate a different entry in a branch target buffer, even though they have the same target address and therefore refer to the same block. This type of duplication is reduced by dropping the predetermined number of least significant bits from the index so that the proximate branch instructions have the same index to a single entry in the branch target buffer.

FIG. 1 is a block diagram of a processing system 100 according to some embodiments. The processing system 100 includes or has access to a memory 105 or other storage component that is implemented using a non-transitory computer readable medium such as a dynamic random access memory (DRAM). However, in some cases, the memory 105 is implemented using other types of memory including static random access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that are configured to execute instructions concurrently or in parallel. The number of processor cores 121-123 implemented in the GPU 115 is a matter of design choice. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that are configured to execute instructions concurrently or in parallel. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that are configured to execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 is able to communicate with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

Figure 2:
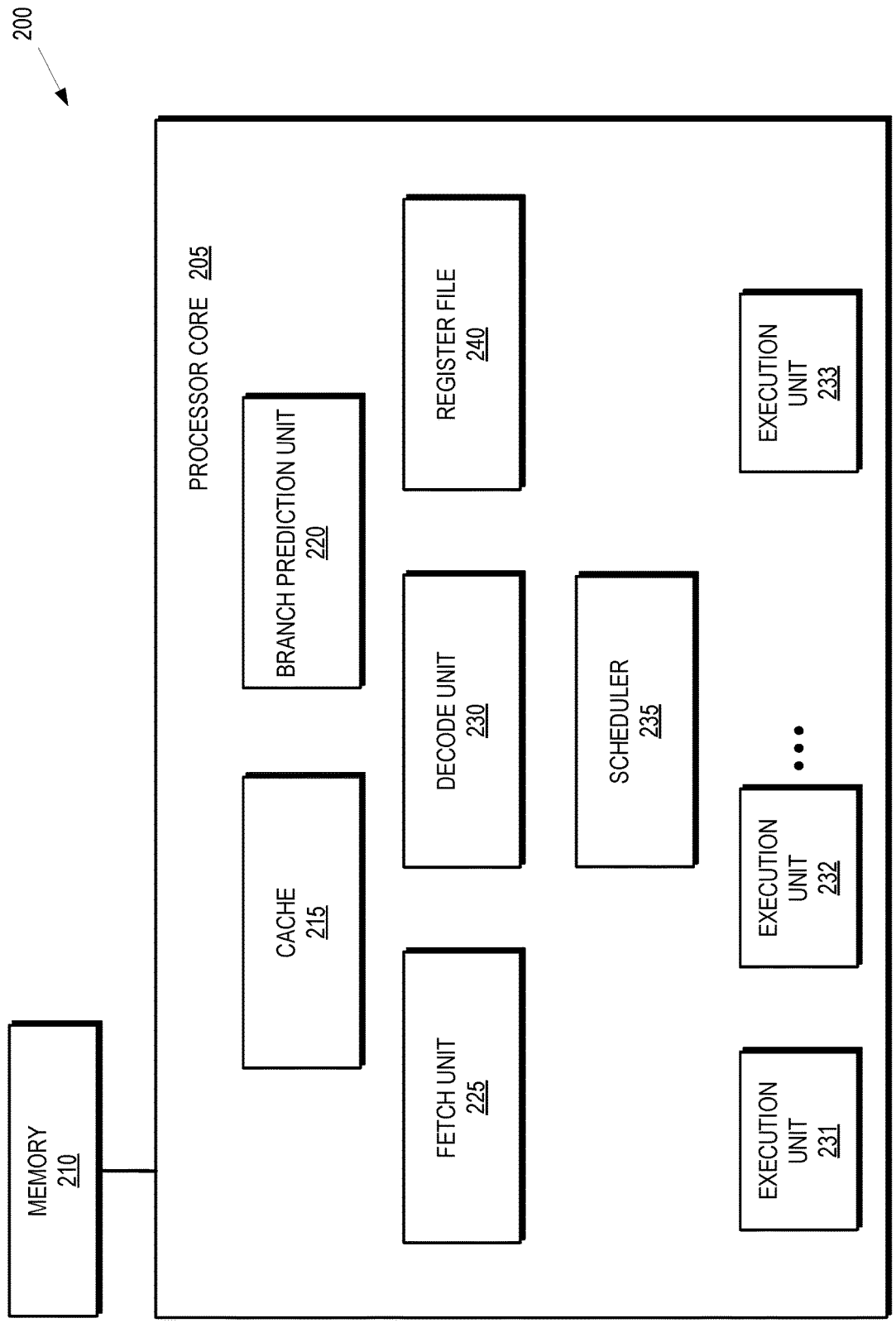
FIG. 2 is a block diagram of a portion of a processing system that includes a processor core according to some embodiments.

FIG. 2 is a block diagram of a portion 200 of a processing system that includes a processor core 205 according to some embodiments. The processor core 205 is used to implement some embodiments of the processor cores 121-123, 131-133 shown in FIG. 1. The portion 200 of the processing system also includes a memory 210 that is used to implement some embodiments of the memory 105 shown in FIG. 1. Copies of some of the information stored in the memory 210 are also stored in a cache 215. For example, frequently accessed instructions are stored in cache lines or cache blocks of the cache 215.

The processor core 205 includes a branch prediction unit 220 that includes conditional branch predictor storage and conditional branch prediction logic. The conditional branch predictor storage stores addresses of locations in the memory 210 and the conditional branch prediction logic is configured to predict outcomes of branch instructions, as discussed in detail below. Branch instructions include conditional branch instructions that redirect the program flow to an address dependent upon whether a condition is true or false. For example, conditional branch instructions are used to implement software constructs such as if-then-else and case statements. Branch instructions also include unconditional branch instructions that always redirect the program flow to an address indicated by the instruction. For example, a JMP instruction always jumps to an address indicated by the instruction. Branch instructions further include call instructions that redirect the program flow to a location of a subroutine and return instructions that redirect the program flow from the subroutine to an instruction following the call instruction in the program flow. In some cases, the target address is provided in a register or memory location so the target can be different each time the branch is executed. Such branches are called indirect branches.

Some embodiments of the branch prediction unit 220 include entries associated with the branch instructions that have been previously executed by the current process or a process that previously executed on the processor core 205. Branch prediction information stored in each entry of the branch prediction unit 220 indicates a likelihood that the branch instruction directs the program flow to an address of an instruction. The entries in the branch prediction unit 220 are accessed based on an address associated with the corresponding branch instruction. For example, the values of the bits (or a subset thereof) that represent a physical address, a virtual address, or a cache line address of the branch instruction are used as an index into the branch prediction unit 220. For another example, hashed values of the bits (or a subset thereof) is used as the index into the branch prediction unit 220. Examples of branch prediction structures include an indirect branch predictor, a return address stack, a branch target buffer, a conditional branch predictor, a branch history, or any other predictor structure that is used to store the branch prediction information.

Some embodiments of the branch prediction unit 220 include non-ahead branch prediction logic and ahead branch prediction logic. As used herein, the phrase "non-ahead branch prediction" refers to branch prediction performed by the branch prediction unit 220 for one or more branch instructions in a block based on entries in a branch prediction structure (such as a branch target buffer) that are accessed based on an address that identifies the block. As used herein, the phrase "ahead branch prediction" refers to branch prediction performed by the branch prediction unit 220 for one or more branch instructions in a block based on entries in the branch prediction structure that are accessed based on an address that identifies a block that was previously or is concurrently being processed in the branch prediction unit 220. For example, the branch prediction unit 220 can predict an outcome of a branch instruction in a first block. The outcome indicates a second block and the ahead branch prediction logic can access entries for branch instructions in the second block based on the address of the first block, as discussed in detail herein.

The branch prediction unit 220 selectively utilizes ahead branch prediction or non-ahead branch prediction based on a type of branch instruction. For example, the ahead branch prediction logic in the branch prediction unit 220 is used to perform branch prediction for conditional and unconditional branch instructions. The non-ahead branch prediction logic in the branch prediction unit 220 is used to perform branch prediction for call instructions that branch to addresses of subroutines, return instructions that return from the subroutine to a subsequent address following the call instruction, and indirect branch instructions. The branch prediction unit 220 determines a type of a branch instruction in a current block concurrently with speculatively predicting outcomes of branch instructions in one or more subsequent blocks that correspond to possible outcomes of the branch instructions in the current block. If the branch prediction unit 220 determines that a type of the branch instruction in the current block is in a predetermined subset of types (e.g., the branch instruction is a call instruction, return instruction, or indirect branch instruction), the state of the branch prediction unit 220 is flushed and branch prediction for one of the subsequent blocks is reinitiated using the non-ahead branch prediction logic based on an address of the subsequent block.

In some embodiments, a branch instruction of a particular type is removed from the predetermined subset of types so that ahead prediction can be used for the branch instruction based on whether the outcome of the branch instruction is predicted based on a BTB entry, an indirect branch predictor, or a return address stack. For example, an indirect branch instruction can be removed from the predetermined subset of types so that ahead prediction is used for the indirect branch instruction in response to a BTB entry predicting the outcome of the indirect branch instruction instead of the indirect branch predictor predicting the outcome, as discussed below. For another example, a return instruction can be removed from the predetermined subset of types in response to a BTB entry predicting the outcome of the return instruction instead of the return address stack predicting the outcome, as discussed below.

A fetch unit 225 fetches information, such as instructions, from the memory 210 or the cache 215 based on addresses received from the branch prediction unit 220. The fetch unit 225 reads the bytes representing the instructions from cache 215 or memory 210 and sends the instruction to a decode unit 230. The decode unit 230 examines the instruction bytes and determines the function of the instruction. The decode unit 230 translates (i.e., decodes) the instruction to generate a series of operations that are to be performed by the processor core 205. These operations are written to a scheduler 235. The scheduler 235 determines when source values for an operation are ready and sends the source values to one or more execution units 231, 232, 233, which are collectively referred to herein as "the execution units 231-233," to perform the operation. The result is written back to a register file 240.

The scheduler 235 schedules execution of the instructions by the processor core 205. Some embodiments of the scheduler 235 perform speculative execution of instructions following a branch instruction that redirects the program flow to an instruction at an address in the memory 210 (or related cache 215) that is indicated by the branch instruction. The processor core 205 is then able to speculatively execute an instruction at the destination address, as well as subsequent instructions along the predicted branch of the program flow. If the predicted branch turns out to be incorrect when the branch instruction is evaluated, speculative execution along the incorrectly predicted branch is suspended and the state of the processor core 205 is rolled back to the state at the branch instruction to begin executing along the correct branch.

Figure 3:
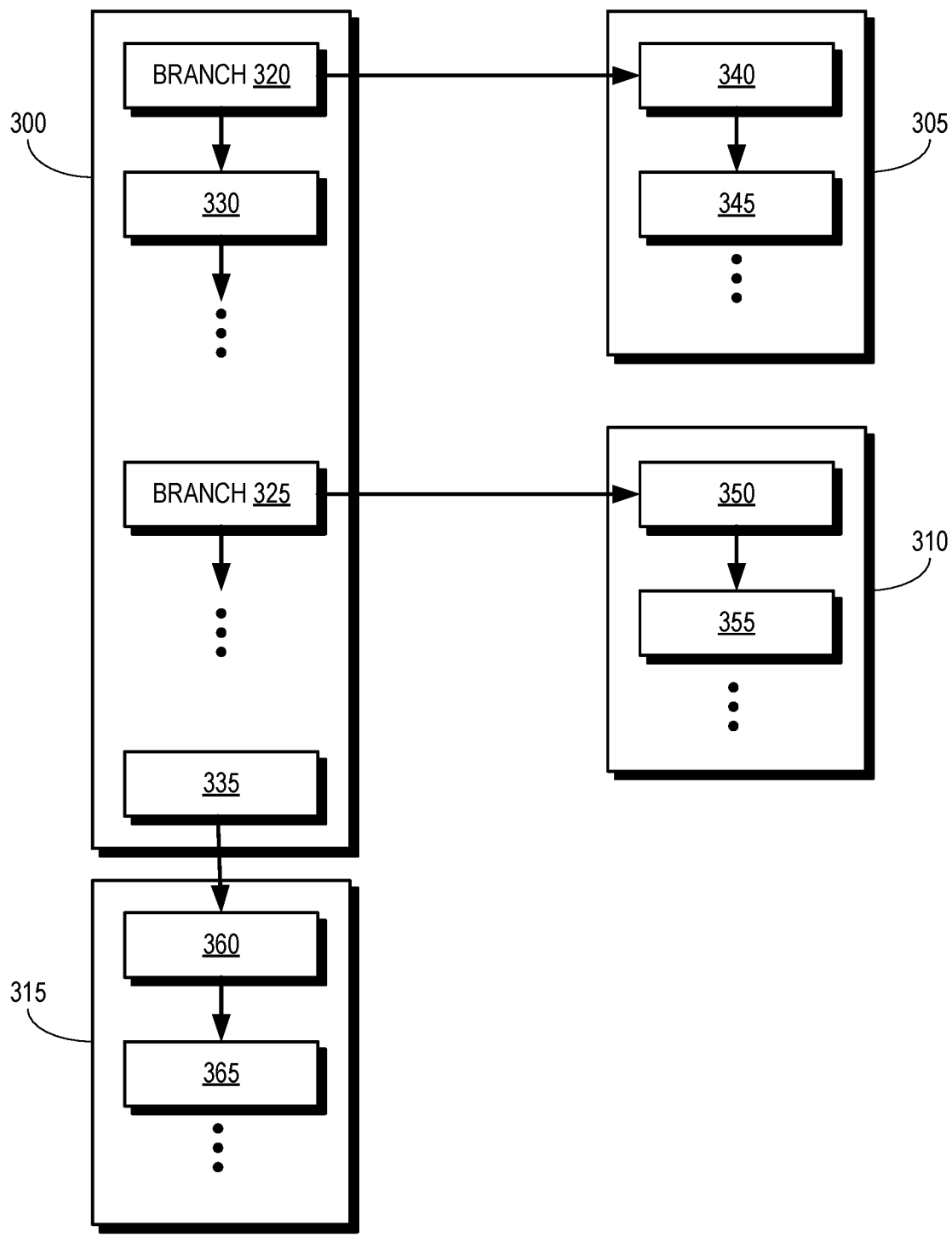
FIG. 3 is a block diagram of a prediction block and a set of blocks corresponding to different possible outcomes of branch instructions in the prediction block according to some embodiments.

FIG. 3 is a block diagram of a prediction block 300 and a set of blocks 305, 310, 315 corresponding to different possible outcomes of branch instructions in the prediction block 300 according to some embodiments. The prediction block 300 includes branch instructions 320, 325 and instructions 330, 335. Some embodiments of the prediction block 300 include fewer branch instructions or additional branch instructions (not shown in FIG. 3 in the interest of clarity). The blocks 305, 310, 315 include instructions 340, 345, 350, 355, 360, 365, respectively. The block 305 is identified by a first address that is a target of the branch instruction 320, the block 310 is identified by a second address that is a target of the branch instruction 325, and the block 315 is identified by a third address subsequent to the branch instruction 325. In the illustrated embodiment, the third address is for a subsequent instruction at a boundary such as a cache line boundary between the blocks 300, 315, such as the instruction 360. In other embodiments, the third address is for a subsequent instruction in the block 300 such as the instruction 335.

A branch predictor such as the branch prediction unit 220 shown in FIG. 2 concurrently predicts outcomes of multiple branch instructions within the prediction block. In the illustrated embodiment, the branch predictor concurrently predicts outcomes of the branch instruction 320 and the branch instruction 325. The possible outcomes of the branch instruction 320 are "taken," in which case the program flow branches to a target address of the instruction 340 in the block 305, or "not taken," in which case the program flow continues sequentially to the instruction 330 in the prediction block 300. The possible outcomes of the branch instruction 325 are "taken," in which case the program flow branches to a target address of the instruction 350 in the block 310, or "not taken," in which case the program flow continues sequentially to the instruction 335 in the prediction block 300.

The instructions 340, 345, 350, 355, 360, 365 in the blocks 305, 310, 315 can include one or more branch instructions. In some embodiments that implement ahead branch prediction, multiple instances of the conditional prediction logic are used to concurrently predict outcomes of the branch instructions in the blocks 305, 310, 315. For example, an address of the block 300 can be used to access information in a conditional branch predictor storage such as prediction information for the blocks 305, 310, 315. The multiple instances of the conditional prediction logic use the accessed information to predict outcomes of the branch instructions in the blocks 305, 310, 315. As discussed in detail below, speculative execution proceeds along a path including a predicted one of the blocks 305, 310, 315.

The branch predictor determines types of the branch instructions 320, 325 concurrently with predicting outcomes of the branch instructions in the blocks 305, 310, 315. In some embodiments, an ahead branch predictor is implemented in the branch predictor to concurrently predict outcomes of the branch instructions in the blocks 305, 310, 315 using corresponding entries in a branch prediction structure that are accessed based on addresses of the blocks 305, 310, 315. Ahead branch prediction is preferential for a first subset of types (such as conditional and unconditional branch instructions) and non-ahead branch prediction is preferential for a second subset of types (such as call instructions, return instructions, and indirect branch instructions). The branch predictor therefore selectively performs ahead or non-ahead branch prediction based on the types of the branch instruction 320, 325. In response to determining that the type of one or more of the branch instructions 320, 325 is in the first subset, the branch predictor continues with ahead branch prediction. In response to determining that the type of one or more of the branch instructions 320, 325 is in the second subset, the state of the branch predictor is flushed and branch prediction is reinitiated for non-ahead branch prediction, e.g., using non-ahead indexing for the branch predictor.

Figure 4:
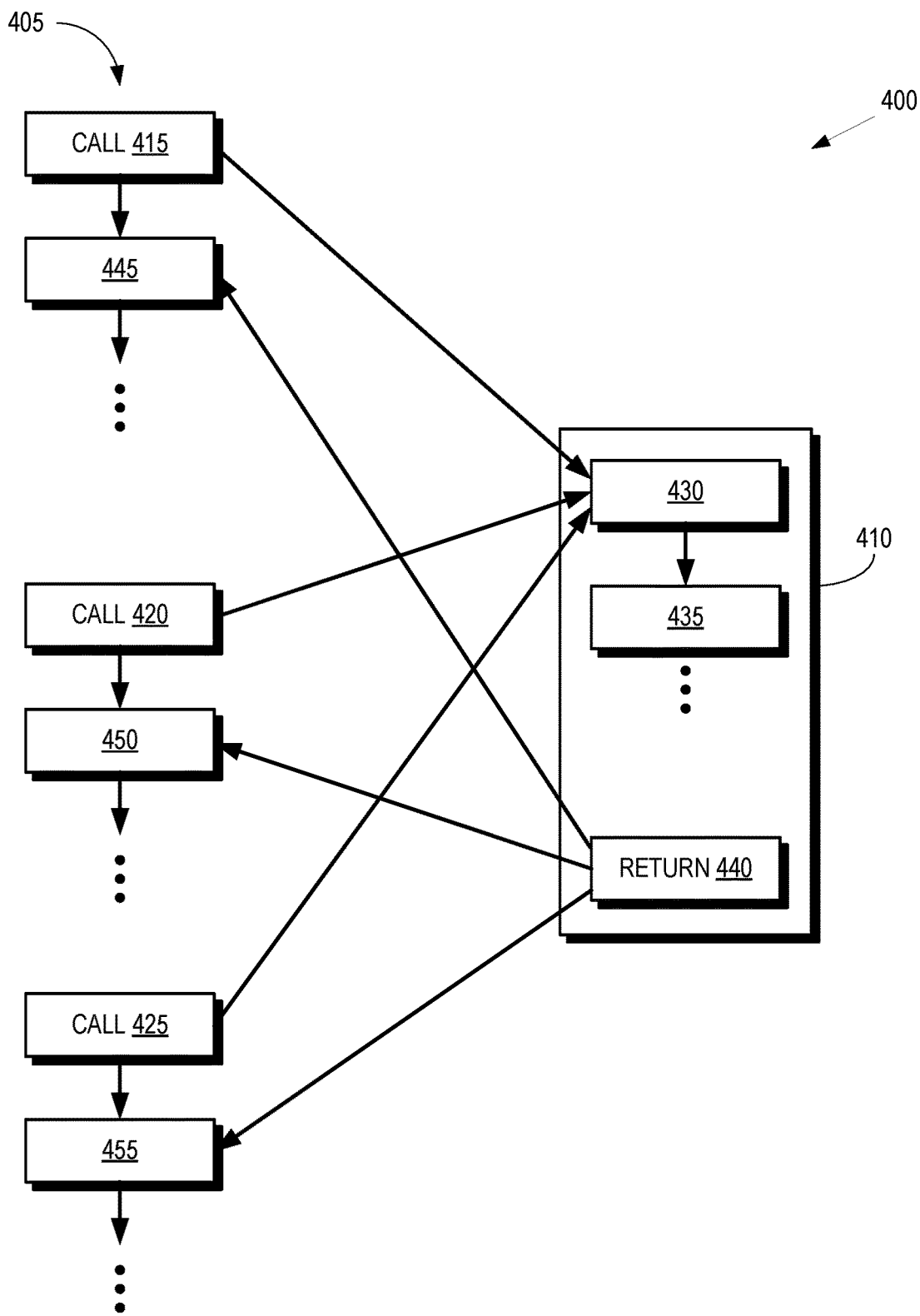
FIG. 4 is a set of instructions that includes a program flow and a subroutine according to some embodiments.

FIG. 4 is a set 400 of instructions that includes a program flow 405 and a subroutine 410 according to some embodiments. The program flow 405 includes call instructions 415, 420, 425 that call the subroutine 410 from different locations in the program flow 405. Some embodiments of the call instructions 415, 420, 425 call the subroutine 410 by redirecting the program flow 405 to an instruction 430 based on an address of the instruction 430. A branch predictor that is utilizing ahead instruction generates entries in a branch prediction structure for branch instructions in a block based on an address in a previous block. Thus, the branch predictor generates an entry in the branch prediction structure for the subroutine 410 for each of the call instructions 415, 420, 425. For example, the branch predictor generates a first entry in the branch prediction structure that is accessed using an address of the call instruction 415, a second entry in the branch prediction structure that is accessed using an address of the call instruction 420, and a third entry in the branch prediction structure that is accessed using an address of the call instruction 425. The branch prediction information in the first, second, and third entries is the same because they refer to the same subroutine 410.

The subroutine 410 includes one or more additional instructions 435 (which include branch instructions in some cases) and a return instruction 440 that redirects the flow back to an instruction subsequent to the call instruction that redirected the program flow 405 to the subroutine 410. For example, the return instruction 440 redirects the flow to the instruction 445 if the subroutine 410 was invoked by the call instruction 415, the instruction 450 if the subroutine 410 was invoked by the call instruction 420, and the instruction 455 if the subroutine 410 was invoked by the call instruction 425. The branch predictor generates entries in the branch prediction structure for blocks identified by the target addresses of the instructions 445, 450, 455. If predict ahead is being used, the entries are indexed by the same source address, i.e., the address of the block containing the return instruction 440. A set-associative branch prediction structure therefore stores the entries for the instructions 445, 450, 455 in the same set, which creates hotspots in the branch prediction structure and causes conflict misses if the number of ways is less than the number entries indexed by the same source address.

Figure 5:
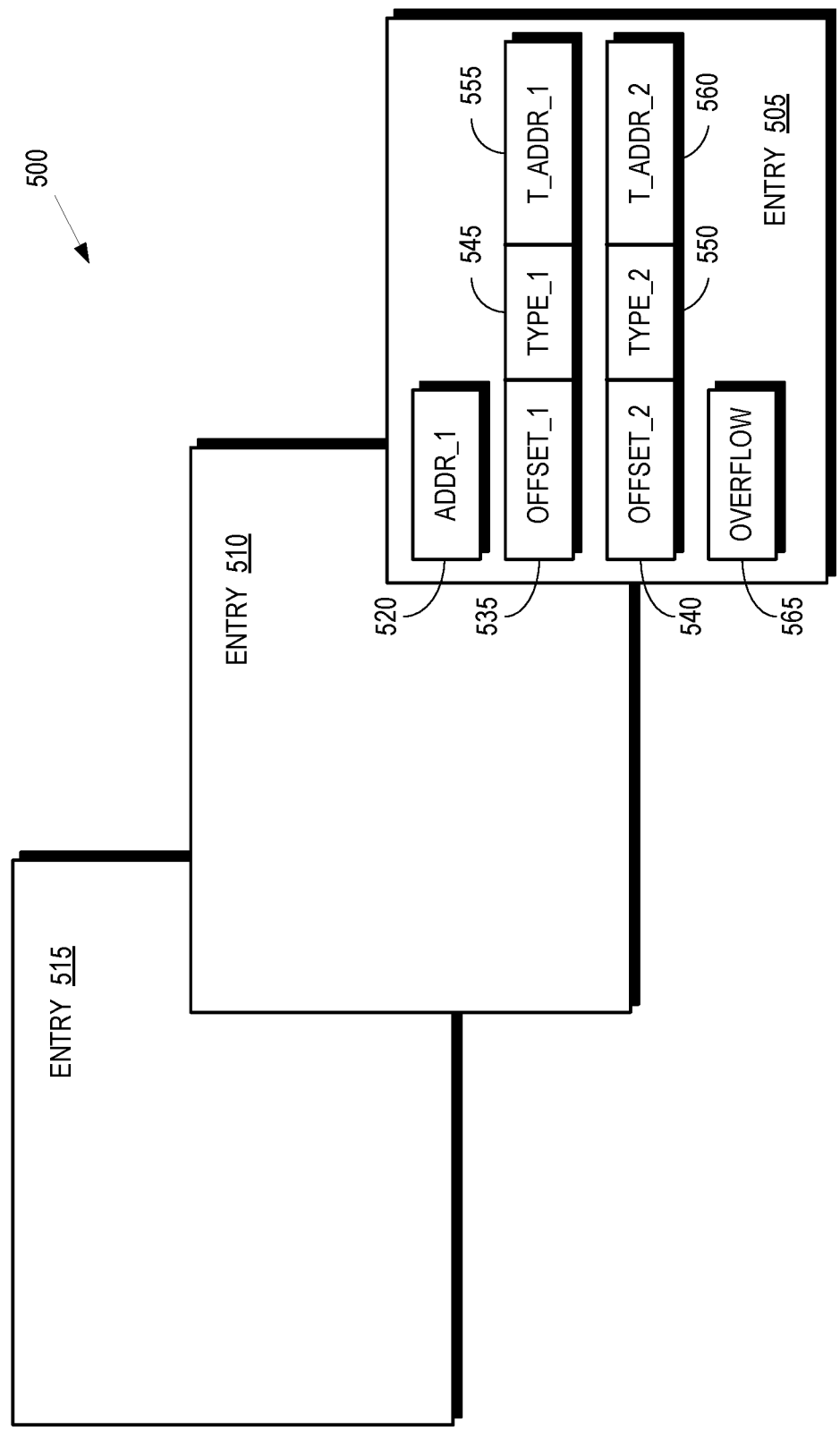
FIG. 5 is a block diagram of a branch prediction structure according to some embodiments.

FIG. 5 is a block diagram of a branch prediction structure 500 according to some embodiments. The branch prediction structure 500 is implemented in some embodiments of the branch prediction unit 220 shown in FIG. 2. The branch prediction structure 500 includes entries 505, 510, 515 that are generated during ahead branch prediction of call instructions such as the call instructions 415, 420, 425 shown in FIG. 4. The call instructions redirect the program flow to the same subroutine, e.g., the subroutine 410 shown in FIG. 4.

The entry 505 includes branch prediction information for two branch instructions. For example, the entry 505 includes an offset 535 that indicates a location of a first branch instruction relative to the address 520 and an offset 540 that indicates a location of a second branch instruction relative to the address 520. The entry 505 also includes information identifying types 545, 550 of the first and second branch instructions and the target addresses 555, 560 of the first and second branch instructions. The program flow branches from the first branch instruction to the target address 555 if the first branch instruction is taken. Otherwise, the program flow continues sequentially with instructions in the block until it reaches the second branch instruction. The program flow branches from the second branch instruction to the target address 560 if the second branch instruction is taken, otherwise the program flow continues sequentially with instructions in the block. An overflow indicator 565 indicates whether there are additional branch instructions before the next sequential boundary. In some embodiments, the sequential boundaries match the instruction cache line boundaries. In other embodiments, the sequential boundaries are set at other aligned addresses. The entry 505 shown in FIG. 5 is one example of an entry in a branch prediction structure such as a branch target buffer. Some embodiments of the entry 505 include different branch prediction information that is organized or structured in a different manner.

The entries 510, 515 are located at different indices of the BTB array because they are indexed by the prior addresses, e.g. the addresses of the blocks that include the call instructions 415, 420, 425 shown in FIG. 4. However, the contents of the entries 510, 515 such as offsets, branch instruction types, target addresses, and overflow values are the same as the contents of the entry 505 because the entries 505, 510, 515 are all generated for the same instruction block, e.g., the instruction block 410 corresponding to the subroutine called by the call instructions 415, 420, 425 shown in FIG. 4. The entries 505, 510, 515 are therefore duplicates of each other that unnecessarily consume space in the branch prediction structure.

Figure 6:
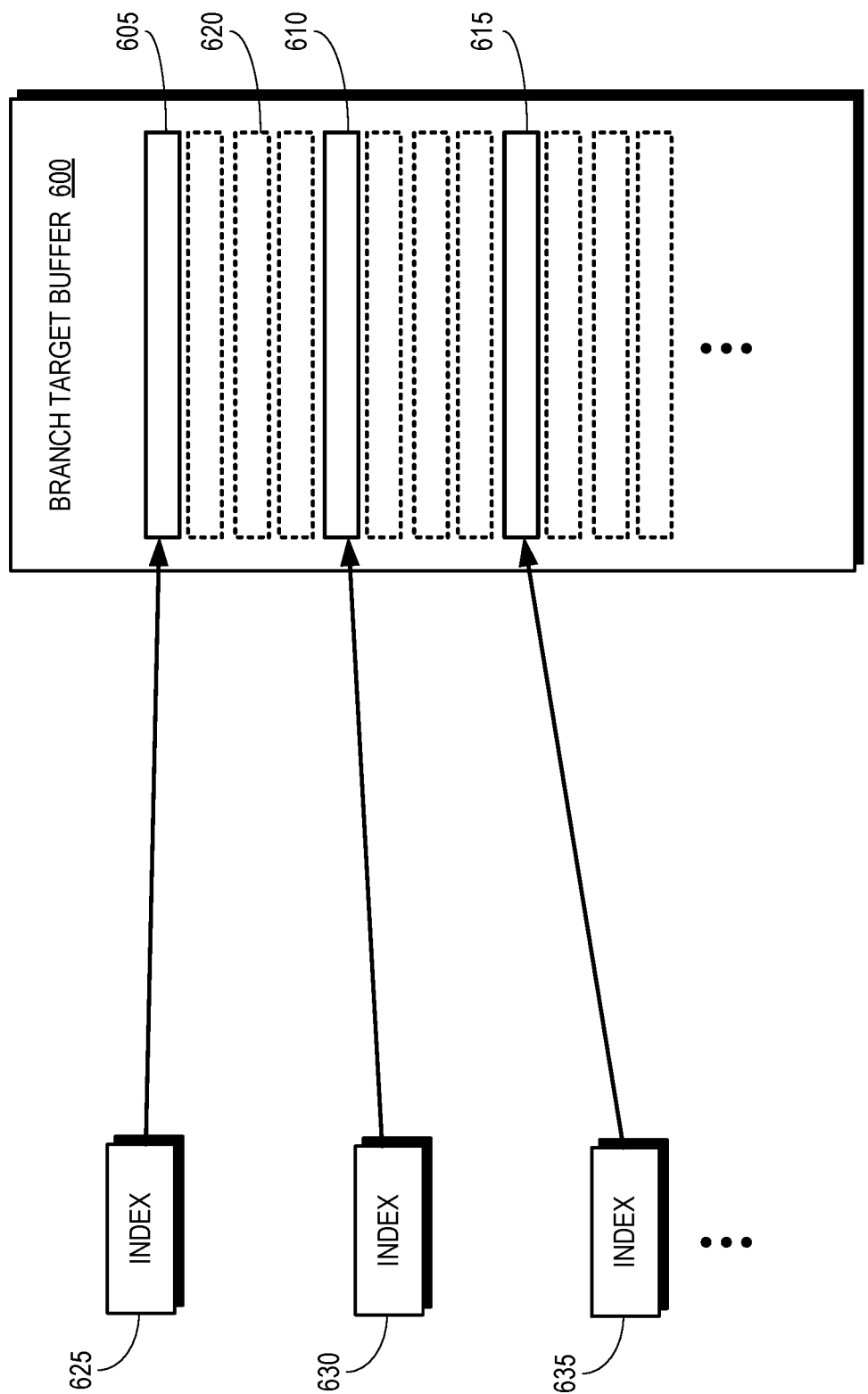
FIG. 6 is a block diagram of a branch target buffer according to some embodiments.

FIG. 6 is a block diagram of a branch target buffer 600 according to some embodiments. The branch target buffer 600 is used to implement some embodiments of the branch prediction unit 220 shown in FIG. 2. The entries in the branch target buffer 600 are indexed using an index that is formed based on an address of a block that includes the branch instruction. For example, when non-ahead prediction is being used, the address of the block that includes the branch instruction is used to generate the index into the entries of the branch target buffer 600. For another example, when ahead prediction is being used, an address of a previous block is used to generate the index into the entries of the branch target buffer corresponding to a current block.

In the illustrated embodiment, the branch target buffer 600 is a 4-way set-associative buffer that stores entries that include branch prediction information for branch instructions in a program flow executing on a corresponding processor core. Thus, each index is mapped to entries in one of four different ways that include multiple entries. For example, the branch target buffer 600 includes entries 605, 610, 615 that correspond to a first way, as indicated by the solid line box. Other entries 620 (only one indicated by a reference numeral in the interest of clarity) correspond to other ways of the 4-way set-associative buffer, as indicated by the dashed line boxes.

A branch predictor generates entries in the branch target buffer 600 for blocks identified by indices 625, 630, 635 that are generated based on addresses associated with corresponding branch instructions. In the illustrated embodiment, the branch predictor implements ahead prediction and the branch instructions associated with the indices 625, 630, 635 are a return instruction in a subroutine. Thus, the indices 625, 630, 635 have the same value because they are generated based on the same source address, i.e., the address of the block containing the return instruction of the subroutine. Entries identified by the indices 625, 630, 635 are therefore created in the entries 605, 610, 615 in the same (first) way in the branch target buffer 600. This creates a hotspot in the first way, particularly if entries are not created (or fewer entries are created) in the other ways 620 of the branch target buffer 600 that are accessed using other indices. The hotspots cause conflict misses if the number of entries in the first way is less than the number entries indexed by the same source address, e.g., if the number of entries consumed by block prediction information for blocks that are accessed via the same return instruction exceeds the number of entries in the first way.

Figure 7:
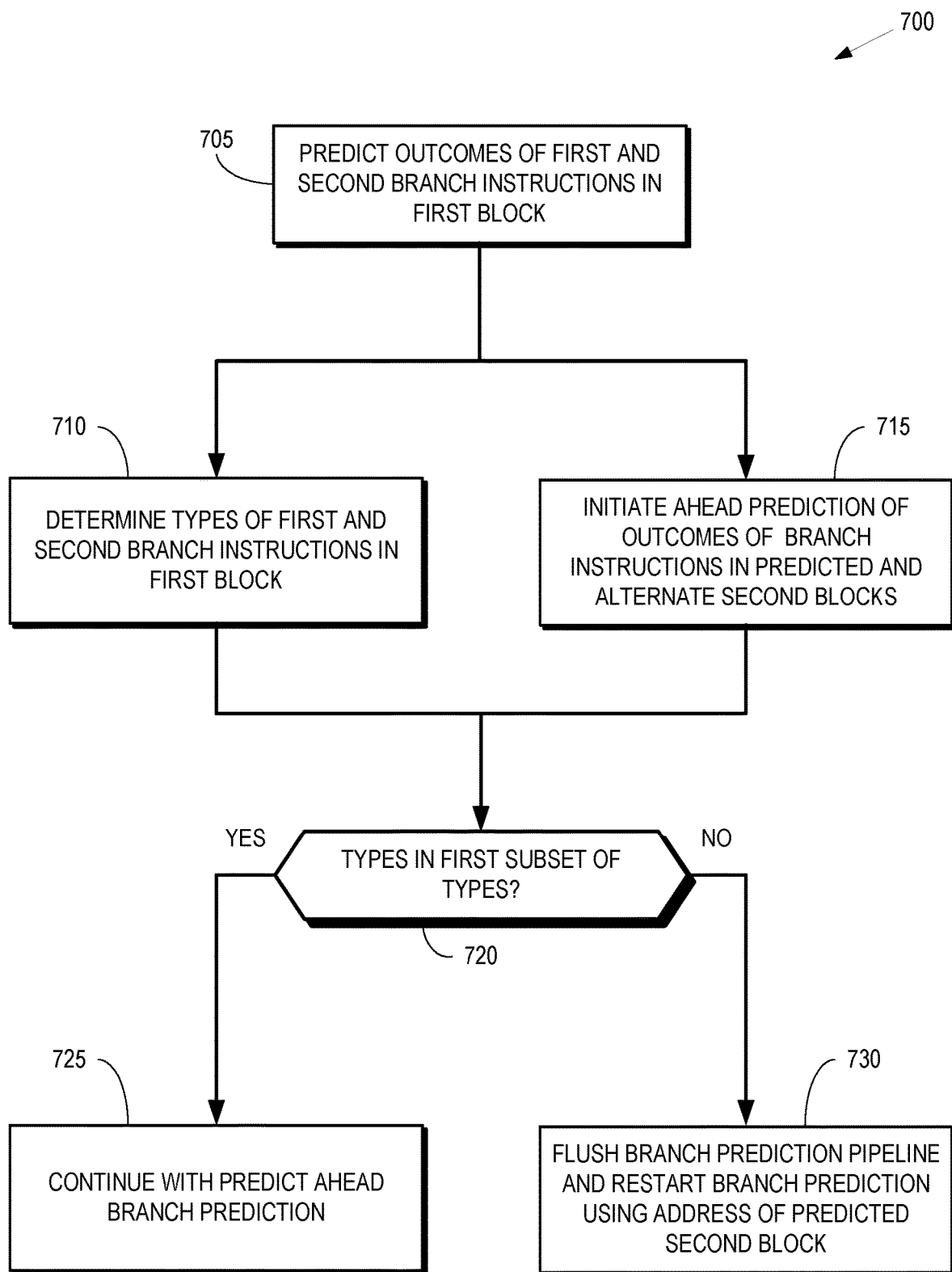
FIG. 7 is a flow diagram of a method of selectively performing non-ahead branch prediction or ahead branch prediction based on a type of a branch instruction according to some embodiments.

FIG. 7 is a flow diagram 700 of a method of selectively performing non-ahead branch prediction or ahead branch prediction based on a type of a branch instruction according to some embodiments. The first portion of the method 700 is implemented in some embodiments of the processing system 100 shown in FIG. 1 and the portion 200 of the processing system shown in FIG. 2. In the illustrated embodiment, the branch predictor concurrently predicts outcomes of up to a predetermined number of branch instructions, such as two branch instructions. However, blocks are not required to include precisely the predetermined number of branch instructions and some blocks include more or fewer than the predetermined number of branch instructions.

At block 705, a branch predictor concurrently predicts outcomes of first and second branches in a first block. As discussed herein, different combinations of outcomes of the first and second branches in the first block correspond to different destination second blocks. The branch predictor identifies one of the second blocks as the "predicted" second block based on the predicted outcomes of the first and second branches. The second blocks corresponding to other outcomes are identified as "alternate" second blocks. The portion of the method 700 then flows to blocks 710, 715.

At block 710, the branch predictor determines types of one or more of the branch instructions in the first block. As discussed herein, the types include a first subset that includes conditional branch instructions and unconditional direct branch instructions and a second subset that includes call instructions, return instructions, and indirect branch instructions. In some embodiments, other types of instructions are included in the first or second subset. For example, indirect branch instructions are included in the first subset in response to an indirect branch predictor generating the address of a predicted second block, as discussed below. For another example, return instructions are included in the first subset in response to a return address stack generating the address of the predicted second block, as discussed below. The branch predictor determines the types of the branch instructions based on branch prediction information retrieved from a branch prediction structure such as the branch prediction structure 500 shown in FIG. 5 and the branch target buffer 600 shown in FIG. 6.

At block 715, the branch predictor initiates ahead prediction of outcomes of branch instructions in the predicted and alternate second blocks. Ahead prediction by the branch predictor is performed based on branch prediction information in entries of the branch prediction structure that are accessed based on an index derived from an address of the first block, as discussed herein. In some embodiments, multiple instances of conditional prediction logic are used to predict outcomes of first and second branch instructions in each of the predicted and alternate second blocks. In some embodiments, a first instance of the conditional prediction logic predicts outcomes of first and second branch instructions in the predicted second block, a second instance predicts outcomes of first and second branch instructions in one of the alternate second blocks, and a third instance predicts outcomes of first and second branch instructions in another one of the alternate second blocks. However, in other embodiments, some or all of the second blocks include more or fewer branch instructions.

The blocks 710, 715 are performed concurrently in the illustrated embodiment. However, some embodiments of the branch predictor perform some or all of the operations in the blocks 710, 715 in other orders including sequentially or in an interleaved manner. The method 700 flows to decision block 720 in response to the branch description determining types of one or more of the branch instructions in the first block.

At decision block 720, the branch predictor determines whether the type of the first predicted taken branch instruction in the first block is in the first subset or the second subset of the set of types. If the branch predictor determines that the branch instruction is in the first subset of types, e.g., the branch instruction is a conditional branch instruction or an unconditional branch instruction, the method 700 flows to block 725 and the branch predictor continues using the ahead branch prediction technique. If the branch predictor determines that the branch instruction is in the second subset of types, e.g., the branch instruction is a call instruction, return instruction, or indirect branch instruction, the method 700 flows to block 730.

As discussed herein, using ahead branch prediction to predict outcomes of branch instructions of the types in the second subset can potentially sacrifice accuracy, relative to conventional branch prediction that uses the address of a block as an index to the information that is used to predict outcomes of branch instructions within the block. In order to preserve accuracy for the branch instructions having types in the second subset, the branch prediction pipeline is flushed at block 730 to remove state associated with ahead prediction of the outcomes in the branch instructions in the predicted and alternate second blocks. Non-ahead branch prediction is then restarted for the predicted second block using branch prediction information accessed from an entry in the branch prediction structure based on an address of the predicted second block.

Figure 8:
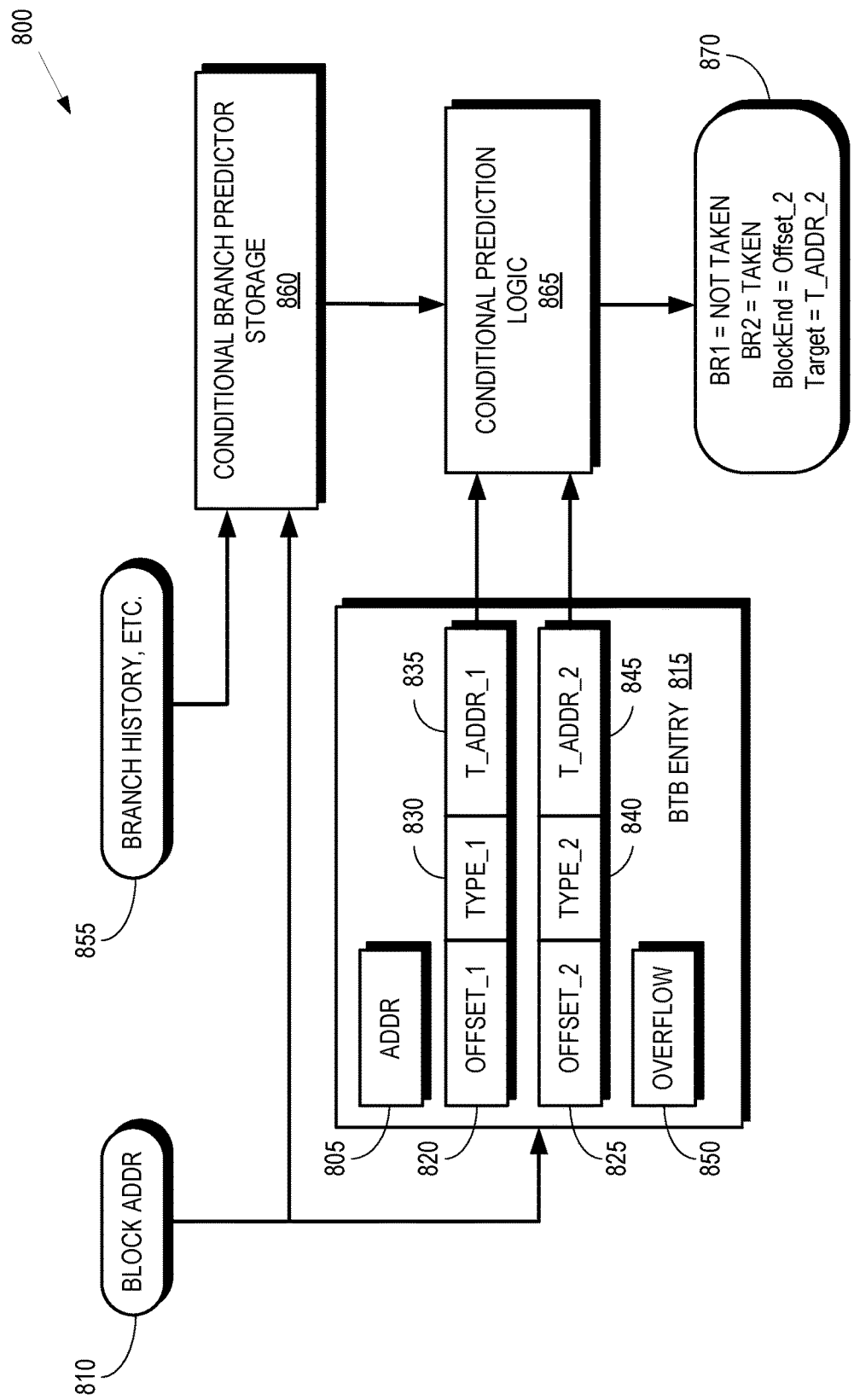
FIG. 8 is a block diagram of a portion of branch prediction unit that includes a branch target buffer and a conditional branch predictor according to some embodiments.

FIG. 8 is a block diagram of a portion of branch prediction unit 800 that includes a branch target buffer and a conditional branch predictor according to some embodiments. The branch prediction unit 800 is used to implement some embodiments of the branch prediction unit 220 shown in FIG. 2. An address 805 indicates a starting address of a block of instructions. Entries in the branch target buffer are indexed by starting addresses of the blocks associated with the entries. In the illustrated embodiment, an index 810 to an entry 815 of the branch target buffer that includes branch prediction information for branch instructions in the block includes a value that is equal to the address 805. The index 810 is therefore used to access the entry 815 of the branch target buffer. For example, the address of the block 300 shown in FIG. 3 is used as an index into an entry of the branch target buffer that corresponds to the branches 320, 325 in the block 300.

The entry 815 includes branch prediction information for two branch instructions. For example, the entry 815 includes an offset 820 that indicates a location of a first branch instruction relative to the address 805 and an offset 825 that indicates a location of a second branch instruction relative to the address 805. The entry also includes information identifying types 830, 835 of the first and second branch instructions and the target addresses 840, 845 of the first and second branch instructions. The program flow branches from the first branch instruction to the target address 840 if the first branch instruction is taken. Otherwise, the program flow continues sequentially with instructions in the block until it reaches the second branch instruction. The program flow branches from the second branch instruction to the target address 845 if the second branch instruction is taken, otherwise the program flow continues sequentially with instructions in the block. An overflow indicator 850 indicates whether there are additional branch instructions before the next sequential boundary. In some embodiments, the sequential boundaries match the instruction cache line boundaries. In other embodiments, the sequential boundaries are set at other aligned addresses. The entry 815 shown in FIG. 8 is one example of an entry in a branch target buffer. Some embodiments of the entry 815 include different branch prediction information that is organized or structured in a different manner.

The branch prediction structure includes conditional branch predictor storage 860 and conditional prediction logic 865. The conditional branch predictor storage 860 stores information that is used to predict outcomes of branch instructions. The index 810 is provided to the conditional branch predictor storage 860 to access the stored information associated with the block indicated by the address 805. In some embodiments, additional information such as branch history information 855 is provided to the conditional branch predictor storage 860. The accessed information associated with the block beginning at the address 805 is provided to the conditional prediction logic 865, which also receives branch prediction information for the branch instructions in the block from the entry 815. The conditional prediction logic 865 uses the information accessed from the entry 815 and the conditional branch predictor storage 860 to predict outcomes of the branch instructions in the block. In the illustrated embodiment, the conditional prediction logic 865 predicts that the first branch instruction is not taken and the second branch instruction is taken. Thus, the conditional prediction logic 865 predicts that the end of the first block is at the location of the second branch instruction (OFFSET_2) and the target address of the second branch instruction is T_ADDR_2.

Figure 9:
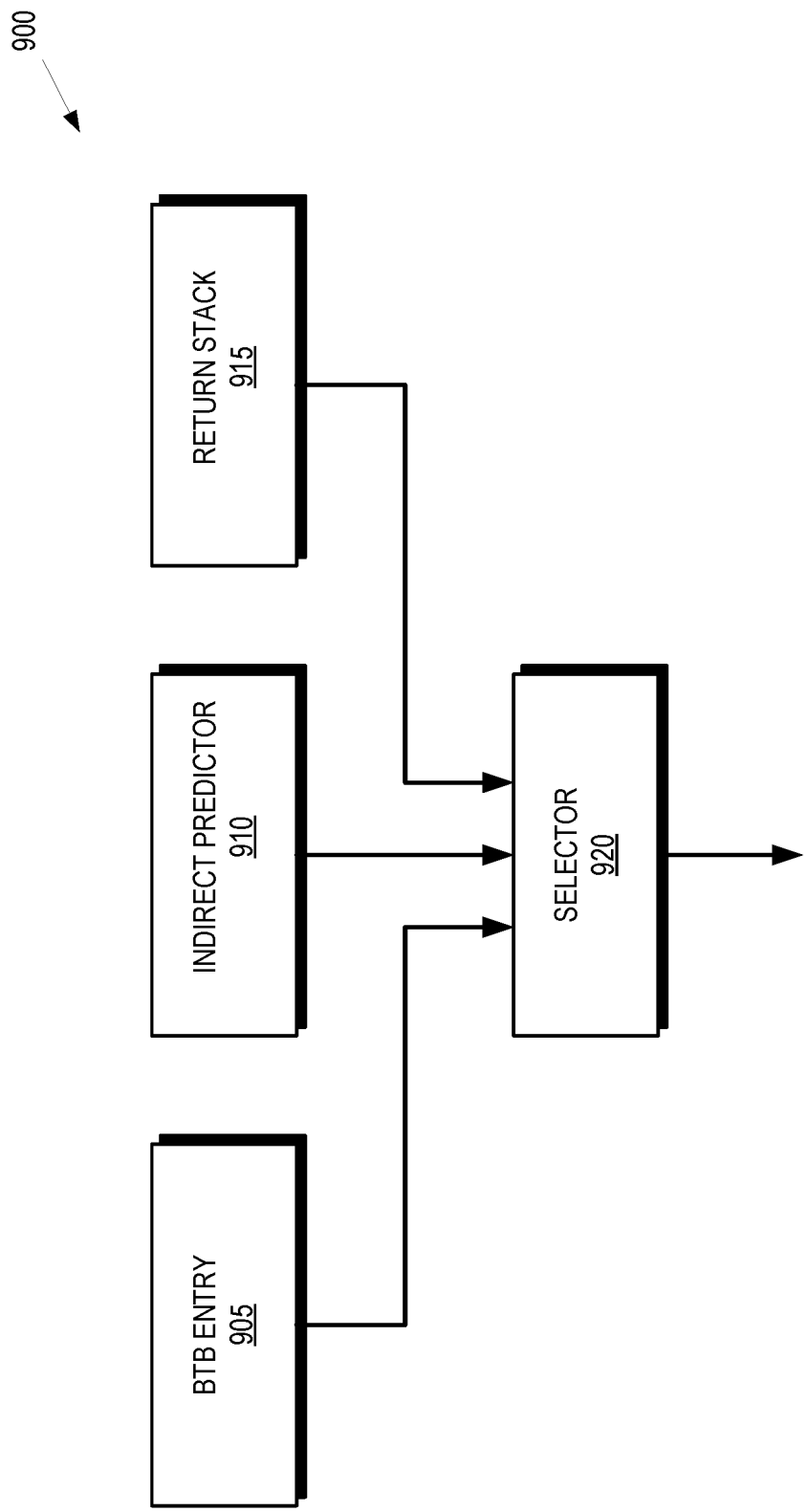
FIG. 9 is a block diagram of a portion of a processing system that selectively allows a subset of return instructions and indirect branch instructions to use "predict ahead" branch prediction according to some embodiments.

FIG. 9 is a block diagram of a portion 900 of a processing system that selectively allows a subset of return instructions and indirect branch instructions to use "predict ahead" branch prediction according to some embodiments. The portion 900 of the processing system is used to implement some embodiments of the processing system 100 shown in FIG. 1 and the portion 200 of the processing system shown in FIG. 2. The illustrated embodiment of the portion 900 includes a BTB entry 905 that stores a target of an indirect branch instruction or a return instruction. An indirect predictor 910 predicts targets of indirect branch instructions and a return address stack 915 predicts return addresses of return instructions. The indirect predictor 910 and the return address stack 915 return different addresses each time an outcome of the corresponding branch is predicted. A first target of an indirect branch instruction or a return is written to the BTB when the branch is first installed, e.g., in the BTB entry 905. The target information stored in the BTB entry 905 for the indirect branch instruction or the return instruction is not subsequently changed.

Predictions from the indirect branch predictor 910 or the return address stack 915 are given priority over predictions in the BTB entry 905. For example, if the indirect predictor 910 predicts a target address for an indirect branch instruction, this target address is selected by a selector 920 for subsequent branch prediction instead of a target address predicted by the BTB entry 905. For another example, if the return address stack 915 predicts a return address for a return instruction, this return address is selected by the selector 920 for subsequent branch prediction instead of a return address predicted by the BTB entry 905. The indirect branch predictor 910 and the return address stack 915 do not always return a prediction. The addresses predicted by the BTB entry 905 are therefore chosen by the selector 920 in the absence of a prediction by the indirect branch predictor 910 or the return address stack 915.

In some embodiments, ahead prediction or non-ahead prediction are selectively used for indirect branch instructions and return instructions depending on which entity generates the address that is chosen by the selector 920. Ahead prediction is used in response to the selector 920 choosing the address predicted by the BTB entry 905 because branch prediction is performed for the same address each time the BTB entry 905 is used for branch prediction. Thus, hotspots are not generated in the BTB array by using ahead prediction in these cases. Non-ahead prediction is used in response to the selector 920 choosing the address predicted by the indirect branch predictor 910 or the return address stack 915 because these entities generate different target addresses each time and may therefore generate hotspots in the BTB array, as discussed herein.

In some embodiments, the apparatus and techniques described above are implemented in a system including one or more integrated circuit (IC) devices (also referred to as integrated circuit packages or microchips), such as the branch prediction described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   accessing, based on a first address of a first block, a set of entries in a branch prediction structure for a set of second blocks corresponding to outcomes of at least one first branch instruction in the first block;
   initiating speculative prediction of outcomes of second branch instructions in the set of second blocks based on the set of entries in the branch prediction structure; and selectively flushing state associated with the speculative prediction based on at least one type of the at least one first branch instruction.

2. The method of claim 1, wherein accessing the set of entries in the branch prediction structure comprises accessing a set of entries in the branch prediction structure for a set of second blocks that are potential targets of the at least one first branch instruction or a block that follows the first block if the at least one first branch instruction is not taken.

3. The method of claim 1, further comprising:
determining the at least one type of the at least one first branch instruction concurrently with the speculative prediction of the outcomes of the second branch instructions in the set of second blocks.

4. The method of claim 3, wherein determining the at least one type of the at least one first branch instruction comprises determining the at least one type of the at least one first branch instruction based on whether an outcome of the at least one first branch instruction is determined by a branch target buffer, an indirect branch predictor, or a return address stack.

5. The method of claim 1, wherein selectively flushing the state comprises flushing the state associated with the speculative prediction of the outcomes of the second branch instructions in response to the at least one type of the at least one first branch instruction belonging to a first subset of a set of types of the branch instructions.

6. The method of claim 5, wherein the first subset comprises call instructions, return instructions, and indirect branch instructions.

7. The method of claim 5, further comprising:
reinitiating speculative prediction of at least one of the second branch instructions in a predicted second block of the second blocks based on an entry in the branch prediction structure that is indexed by a second address of the predicted second block.

8. The method of claim 7, wherein the predicted second block corresponds to a predicted outcome of the at least one first branch instruction in the first block.

9. The method of claim 5, wherein selectively flushing the state comprises bypassing flushing the state and continuing with the speculative prediction in response to the at least one type of the at least one first branch instruction belonging to a second subset of the set of types of the branch instructions.

10. The method of claim 1, further comprising:
generating an index into the branch prediction structure by dropping a predetermined number of least significant bits from the first address of the first block.

11. An apparatus comprising:
a branch predictor configured to predict outcomes of at least one first branch instruction in a first block and access, based on a first address of the first block, a set of entries in a branch prediction structure for a set of second blocks corresponding to the outcomes of the at least one first branch instruction in the first block; and
fetch logic to fetch instructions for speculative prediction of outcomes of second branch instructions in the set of second blocks based on the set of entries in the branch prediction structure,
wherein state associated with the speculative prediction is selectively flushed from the branch predictor based on at least one type of the at least one first branch instruction.

12. The apparatus of claim 11, wherein the branch predictor is configured to access the set of entries in the branch prediction structure for a set of second blocks that are potential targets of the at least one first branch instruction or a block that follows the first block if the at least one first branch instruction is not taken.

13. The apparatus of claim 11, wherein the branch predictor is configured to determine the at least one type of the at least one first branch instruction concurrently with the speculative prediction of the outcomes of the second branch instructions in the set of second blocks.

14. The apparatus of claim 13, wherein the branch predictor is configured to determine the at least one type of the at least one first branch instruction based on whether an outcome of the at least one first branch instruction is determined by a branch target buffer, an indirect branch predictor, or a return address stack.

15. The apparatus of claim 11, wherein the state associated with the speculative prediction of the outcomes of the second branch instructions is flushed in response to the at least one type of the at least one first branch instruction belonging to a first subset of a set of types of the branch instructions.

16. The apparatus of claim 15, wherein the first subset comprises call instructions, return instructions, and indirect branch instructions.

17. The apparatus of claim 15, wherein the branch predictor is configured to reinitiate speculative prediction of at least one of the second branch instructions in a predicted second block of the second blocks based on an entry in the branch prediction structure that is indexed by a second address of the predicted second block.

18. The apparatus of claim 17, wherein the predicted second block corresponds to a predicted outcome of the at least one first branch instruction in the first block.

19. The apparatus of claim 15, wherein the branch predictor is configured to bypass flushing the state and continuing with the speculative prediction in response to the at least one type of the at least one first branch instruction belonging to a second subset of the set of types of the branch instructions.

20. The apparatus of claim 11, wherein the branch predictor is configured to generate an index into the branch prediction structure by dropping a predetermined number of least significant bits from the first address of the first block.

21. An apparatus comprising:
a branch target buffer (BTB) configured to store entries including branch prediction information for branch instructions in corresponding blocks;
a first branch predictor configured to predict outcomes of up to a predetermined number of branch instructions in a first block based on entries in the BTB that are accessed using a first address of the first block; and
a second branch predictor configured to speculatively predict outcomes of up to the predetermined number of branch instructions in a plurality of second blocks based on entries in the BTB that are accessed using the first address of the first block, the second blocks corresponding to outcomes of the branch instructions in the first block,
wherein state associated with the speculative prediction is selectively flushed from the second branch predictor, and prediction of outcomes of branch instructions in one of the second blocks is selectively initiated in the first branch predictor, based on at least one type of at least one of the branch instructions in the first block.

22. The apparatus of claim 21, wherein the state associated with the speculative prediction is flushed in response to the at least one type belonging to a first subset of a set of types of the branch instructions, and wherein the state associated with the speculative prediction is not flushed in response to the at least one type belonging to a second subset of the set of types of the branch instructions.

23. The apparatus of claim 22, wherein the first subset comprises call instructions, return instructions, and indirect branch instructions.

24. The apparatus of claim 23, wherein the return instructions or the indirect branch instructions are removed from the first subset in response to outcomes of the return instructions or the indirect branch instructions being predicted based on an entry in the BTB.

25. The apparatus of claim 21, wherein the first branch predictor is configured to reinitiate speculative prediction of at least one of the branch instructions in a predicted second block of the second blocks based on an entry in the BTB that is indexed by a second address of the predicted second block.

26. The apparatus of claim 25, wherein the predicted second block corresponds to a predicted outcome of at least one of the branch instructions in the first block.

* * * * *